Jan. 16, 1968  L. B. FOLKINS ET AL  3,363,318
TRAILER HITCH SIGHT
Filed Oct. 22, 1965  3 Sheets-Sheet 3
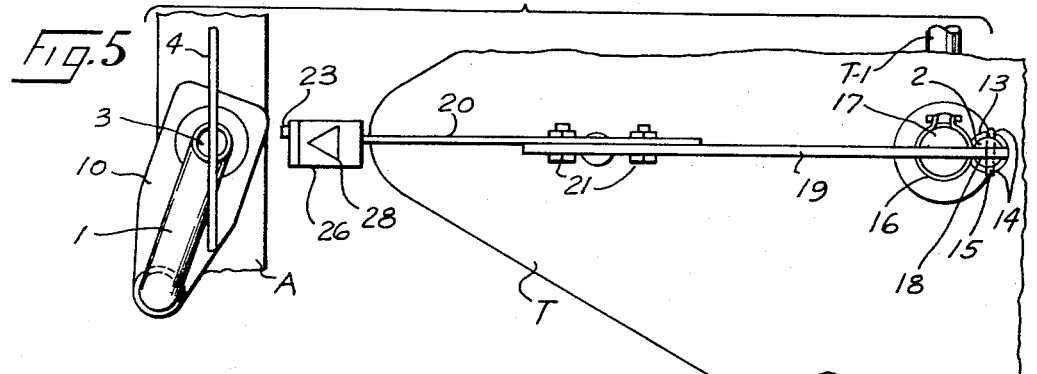
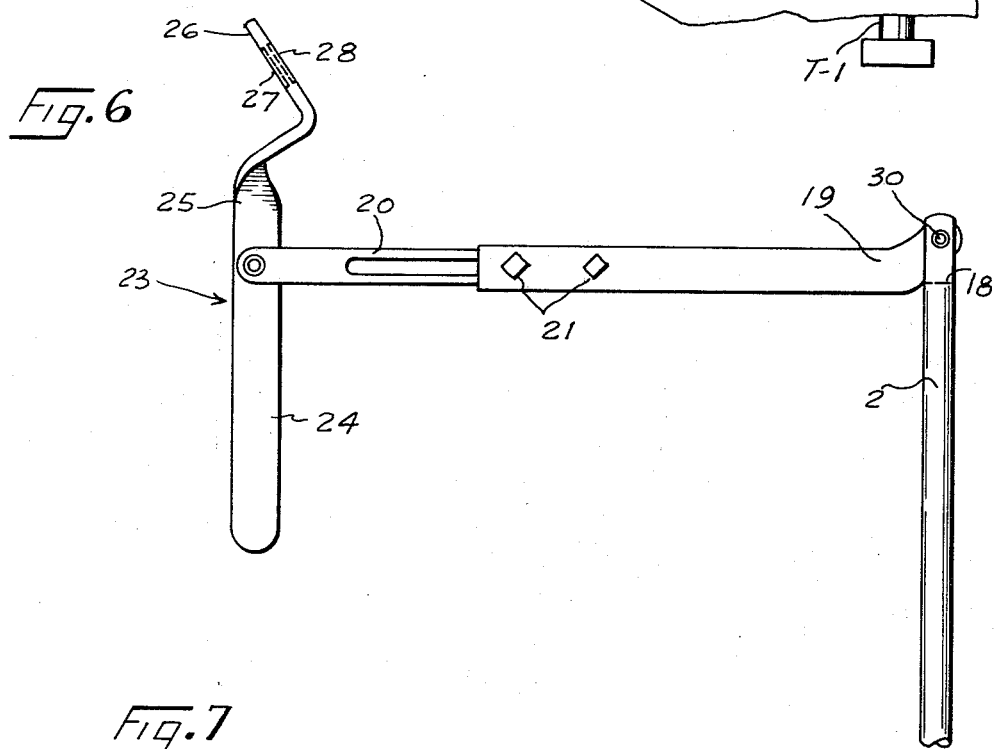
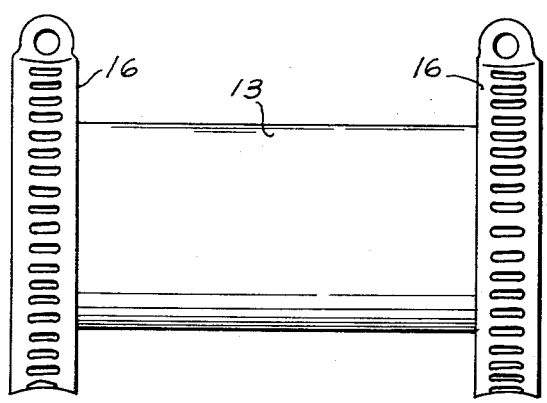
INVENTOR.
LEWIS B. FOLKINS
DAN LEE FOLKINS
BY Wells & St. John
ATTYS.

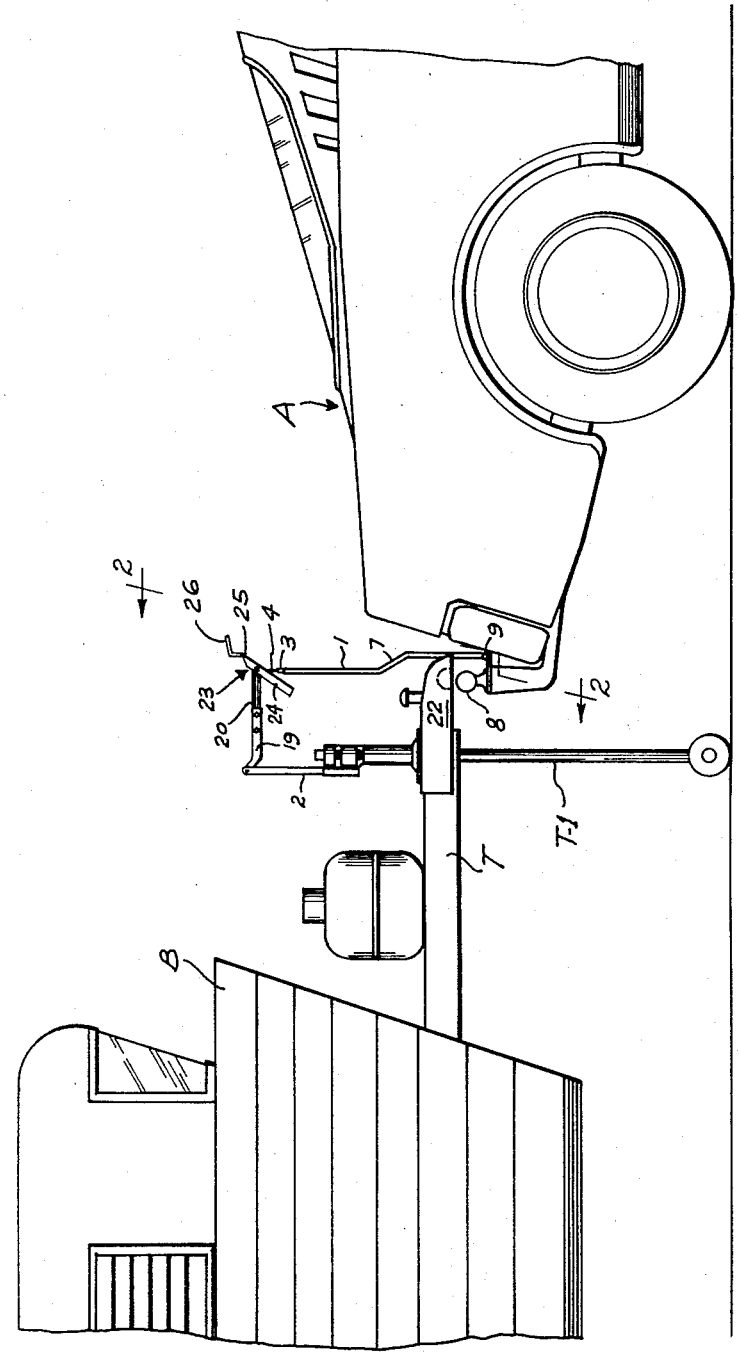

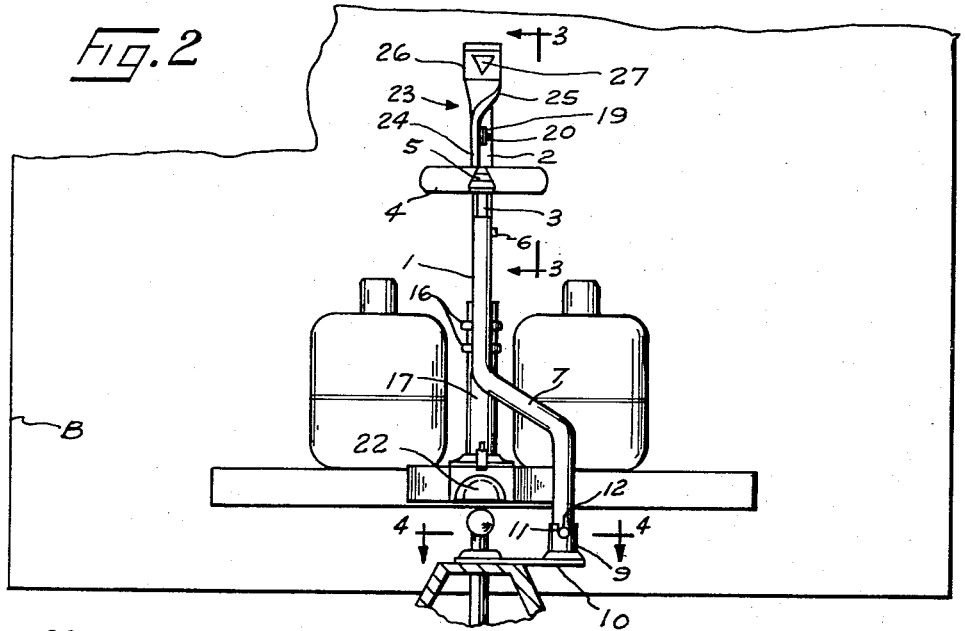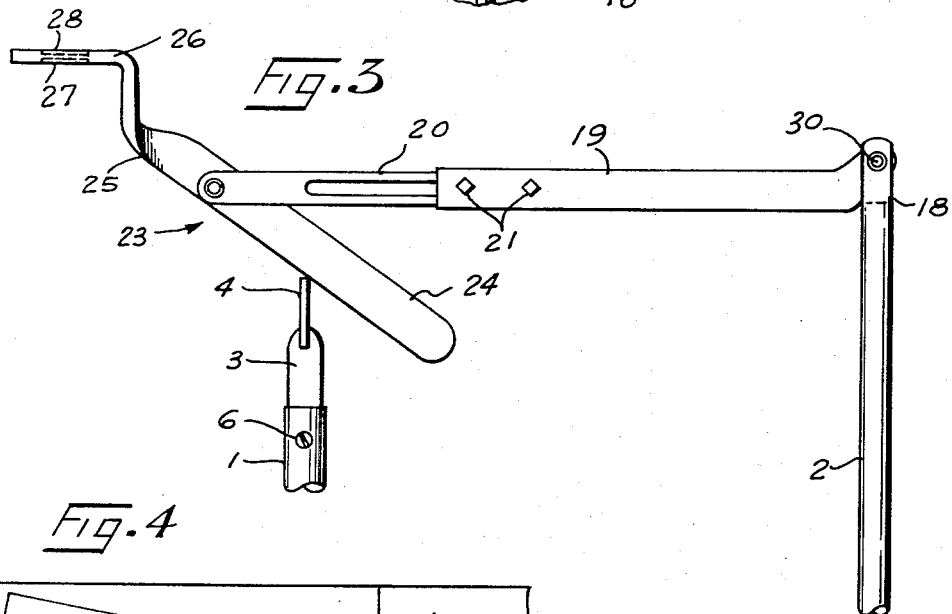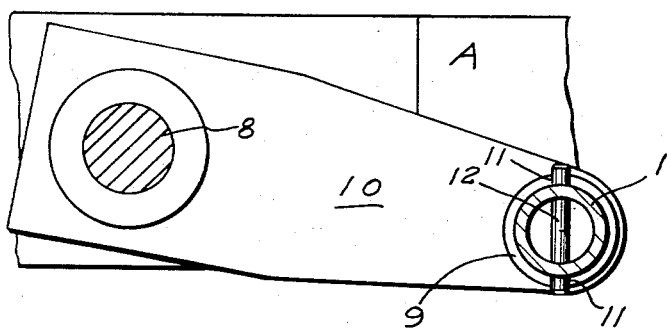

United States Patent Office 3,363,318
Patented Jan. 16, 1968

3,363,318
TRAILER HITCH SIGHT
Lewis B. Folkins and Dan Lee Folkins, both of Box 250,
Tekoa, Wash. 99033
Filed Oct. 22, 1965, Ser. No. 501,392
8 Claims. (Cl. 33—46)

ABSTRACT OF THE DISCLOSURE

The disclosure describes a trailer hitch sight for the accurate vertical alignment of the respective hitch members of a towing vehicle and trailer preliminarily to connecting the hitch members. It includes a support member 1 mounted to the towing vehicle and support member 2 mounted to the trailer. A vertically adjustable transverse bar 4 is mounted to the support member 1. A bar 19 is on the support member 2 and extends forward over the trailer hitch member. A lever 23 is vertically mounted on the free end of the forward extending bar for pivotal movement in a vertical plane when engaged by the transverse bar 4 of the towing vehicle. The upper end of the lever is bent so that when the transverse bar is immediately over the hitch member of the trailer, the driver will see the end edge of the lever making the distinctive colored pointers 27 and 28 on the faces of the lever invisible. If the towing vehicle is moved back too far, the driver will see the colored pointer on the upper face 28 of the lever. A pointer 5 is mounted on the transverse bar to indicate when the hitch members are transversely aligned.

---

Our invention relates to a trailer hitch sight to be used by drivers of automotive vehicles pulling trailer vehicles to tell them when their vehicle and the trailer are properly positioned for coupling together. The proper positioning of the towing vehicle with respect to the trailer vehicle has been a difficult matter for drivers who are alone. They can, through the rear view mirror, get some idea of right and left alignment, but so far as we are aware, there is no trailer hitch sight that provides a positive indication of both right and left alignment and fore and aft position to the driver of the towing vehicle who is in the vehicle and is maneuvering the vehicle to try and position it where the hitch members are matched up for connection.

It is the purpose of our invention to provide a trailer hitch sight embodying two cooperating uprights, one of which has means for attaching it to the towing vehicle and the other of which has means for attaching it to the trailer vehicle with sight markers on the members visible to the driver seated in the towing vehicle for right and left alignment and one marker being movable by the other to show visibly to the driver that the hitch elements on the trailer vehicle and the towing vehicle are in fore and aft alignment.

The nature and advantages of our invention will appear more fully from the following description and the accompanying drawings illustrating a preferred form of the invention. It will be understood that minor changes may be made from the exact details shown and described without deviating from the principles of the invention.

In the drawings:

FIGURE 1 is a side view showing a towing vehicle and a trailer with our invention applied thereto, the parts being in position for connection of the hitch members to each other upon lowering of the trailer vehicle tongue;

FIGURE 2 is an enlarged fragmentary sectional view taken substantially on the line 2—2 of FIGURE 1, but showing the sight markers in the position they occupy when the vehicle hitch members are aligned right and left but are not aligned fore and aft;

FIGURE 3 is an enlarged side view of the trailer hitch sight members in the position they occupy when the hitch members are in alignment for securing them together;

FIGURE 4 is an enlarged sectional view taken on the line 4—4 of FIGURE 2;

FIGURE 5 is an enlarged plan view of the sight marker unit that is mounted on the trailer vehicle;

FIGURE 6 is an enlarged side view of the sight marker unit that is carried on the trailer vehicle; and FIGURE 7 is an enlarged detail view of the clamp employed to mount the support for the sight marker unit on the trailer vehicle.

Referring now to the drawings, our invention embodies a simple mechanism comprising an upright sight support member 1 on the towing vehicle A and a second upright sight support member 2 on the tongue T of the trailer vehicle B. The member 1 is tubular to receive a stem 3 of a cross bar 4 that has a distinctly colored pointer portion 5 formed thereon. The stem 3 can be adjusted up and down in the member 1 and is locked in place by a set screw 6. The member 1 is offset intermediate its ends at 7 to extend down alongside the ball hitch member 8 on the towing vehicle into a socket 9 on a plate 10 that extends laterally from the ball member 8 and is affixed to the base thereof. The socket 9 is notched at 11 and the upright sight support member 1 has a pin 12 fixed in it to seat in the notch 11.

The second upright sight support member 2 is seated in a socket 13 in the same manner as the upright sight support member 1 is seated in the socket 9. The socket 13 it notched at 14 to receive a pin 15 on the member 2. A pair of pipe clamps 16 secure the socket 13 to a standard 17 which is commonly provided on trailer tongues for the tongue support T–1. The top of the upright sight support member 2 is slotted at 18 to receive a bar 19. The bar 19 is bent near the member 2 and is pivoted to the member 2 by a pin 30 so that the bar 19 extends forward over the tongue T. The bar 19 carries a slotted bar 20 by means of two bolts 21 extending through the bars so the bar 20 can be moved toward and away from the member 2 to adopt it to different trailer tongues having different spacing from the standard 17 to the ball receiving socket member 22 on the tongue T.

The bar 20 has a lever 23 pivoted on its free end for swinging in a vertical plane. This lever 23 has a straight portion 24 extending down and a twisted portion 25 extending up from its pivotal connection. The twisted portion 25 terminates in a forwardly and upwardly extending tip 26 which has distinctively colored pointer portions 27 and 28 on its front and back faces.

To utilize the hitch sight of the present invention for positioning a towing vehicle A for connection to a trailer vehicle B, the upright member 1 is first placed in its socket 9 and the upright member 2 is placed in its socket 13 while the vehicles are positioned with the ball member 8 and the socket member 22 vertically aligned. The stem 3 is adjusted in height and the bar 20 is adjusted forward or back until the cross bar 4 on the stem 3 and the lever 23 occupy the positions shown in FIGURE 3. In this position the tip 26 on the lever 23 extends horizontally forward so that the operator looking through his mirror in the car can see the pointer portion 5 on the cross bar 4 directly in line with the lever 23 but both pointer portions 27 and 28 are invisible on the tip 26 and only the end of this tip is seen. This tip may also be distinctively colored to contrast with the portions 27 and 28.

After this preliminary setting of the parts, the upright members 1 and 2 and the parts carried thereby can be removed from the sockets 9 and 13 and stored in one of the vehicles. When the vehicles are to be aligned for hitching together the upright member 1 is placed in the socket 9 and the upright member 2 is replaced in the socket 13. The operator then backs the towing vehicle A toward the vehicle B and through his rear view mirror he can see when the pointer portion 5 on the cross bar 4 is aligned transversely with respect to the lever 23 and its pointer portion 27. Then by backing the towing vehicle A slowly he can cause the cross bar 4 to engage the lever 23 and tilt it back until the pointer portion 27 disappears. If he goes a little too far the pointer portion 28 will appear above the end of the tip 26. Thus he is able accurately to determine when the ball member 8 and the socket member 22 are aligned in a fore and aft direction without getting out of the towing vehicle. The hitch is then completed by lowering the tongue T until the members 8 and 22 are seated.

It is believed that the nature and advantages of our invention will be clear from the foregoing description.

We claim:

1. A device for assisting a driver of a towing vehicle to maneuver the towing vehicle toward the trailer to position the hitch member of the towing vehicle in vertical alignment with the hitch member of a trailer, said device comprising:
    (a) a first upright sight support member mounted to the trailer adjacent the hitch member thereof;
    (b) a longitudinal bar mounted on the first support members and extending forward;
    (c) a normally vertical lever pivotally mounted to the forward end of the longitudinal bar for fore and aft swingable movement;
    (d) a second upright sight support member mounted to the towing vehicle adjacent the hitch member thereof;
    (e) a transverse bar mounted on the second support member vertically above the towing vehicle hitch member for engagement with the pivotable level to pivot the lever as the towing vehicle moves toward the trailer; and
    (f) an indicator on said lever that has
        (1) a color distinctive indicator surface normally facing forward in which the projected area of said surface that can be viewed by the driver decreases as the lever is pivoted by the transverse bar with minimum exposure occurring when the towing vehicle hitch member and the trailer hitch member are in vertical alignment to indicate to the driver when the towing vehicle hitch member is approaching and is in vertical alignment with the trailer hitch member; and
        (2) a second color distinctive surface that is normally hidden from the view of the driver unless the towing vehicle hitch member is moved past that trailer hitch member causing the transverse bar to further pivot the lever to expose the second surface to the view of the driver in which the projected area of said second surface increases in proportion to the overtravel of the towing hitch member for indicating to the driver that the towing vehicle hitch member has moved past the trailer hitch member.

2. The device as defined in claim 1 wherein the lower end of the lever is engaged by the transverse bar to pivot the upper end forward.

3. The device as defined in claim 2 wherein the indicator is formed on the upper end of the lever in which the indicator surface is pivoted forward and downward as the lever is pivoted by the transverse bar to progressively decrease the projected area of said surface that may be viewed by the driver to indicate that the towing vehicle hitch member is approaching vertical alignment with the trailer hitch member.

4. The device as defined in claim 3 wherein the indicator surface has a colored pointer formed thereon.

5. The device as defined in claim 1 wherein the second surface normally faces rearward and upward and is pivoted forward and downward into view of the driver when the towing vehicle trailer hitch moves past the trailer hitch member.

6. The device as defined in claim 5 wherein a colored pointer is formed on the second surface.

7. The device as defined in claim 1 wherein the indicator is an extension of the upper lever and that is bent forward with the front surface of said indicator facing forward and downward and the back surface of said indicator facing rearward and upward so that as the lever is pivoted by the transverse bar the driver will see the front surface of the indicator when the towing vehicle hitch member is forward of the trailer hitch member and when the towing vehicle hitch member is aft the trailer hitch member the driver will see the rear surface of the indicator and when the towing vehicle hitch member is directly over the trailer hitch member the driver will see neither indicator surfaces.

8. The device as defined in claim 1 wherein the first and second upright support members have transverse pins extending therefrom near the lower ends thereof and wherein the device further comprises sockets with opposing notches mounted on the towing vehicle and trailer adjacent the hitch members for removably receiving the first and second upright support members and preventing the rotation of the same so that upright support members are precisely angularly aligned with respect to the hitch members.

References Cited

UNITED STATES PATENTS 2,815,732  12/1957  Majors _____ 33—46.1
3,159,917  12/1964  Whitehead _____ 33—46.1

LEONARD FORMAN, *Primary Examiner.*

R. A. FIELDS, *Assistant Examiner.*